Patented June 25, 1935

2,006,208

UNITED STATES PATENT OFFICE 2,006,208

DULL FINISH COATED PAPER

Donald B. Bradner, Oxford, Ohio, assignor to The Champion Coated Paper Company, Hamilton, Ohio, a corporation of Ohio No Drawing. Application February 1, 1932, Serial No. 590,315

10 Claims. (Cl. 91—68)

The present invention relates to dull finish coated papers, and is concerned with coating processes for use in the production of dull finish coated papers.

By the expression "coated paper" as here used is meant a paper rawstock, including postcard, cardboard and like papers, one or both sides of which are coated with a composition consisting essentially of an aqueous suspension of a pigment and adhesive whereby to improve the appearance and/or printing qualities of the paper.

Coated paper may have any degree of "finish", varying from an extremely high glaze (known as a "high finish") to a very dull finish. Although it is generally conceded that dull finish coated papers have greater artistic merit and are free from objectionable glare, it heretofore has been the common experience that such papers did not print as well as the glossy varieties, absorbing ink too freely and unevenly so that halftone impressions were "muddy" and solid color printings were deficient in brilliancy and were uneven in tone, or "spotty". It is believed that these disadvantageous characteristics of prior art dull finish coated papers were attributable largely to the fact that there have been used, generally, in the manufacture of the same, coatings comprising crystalline mineral pigments of relatively large grain size.

An object of the present invention is the provision of dull finish coated papers having improved printing qualities. Other objects of invention include the provision of smooth, dull finish, coated papers and of a process by which the same may be produced at reasonable cost.

I have found that these objects of invention are accomplished by coating paper with an aqueous coating composition consisting essentially of pigment and adhesive, a part at least of said pigment being uncooked starch, drying the so-coated paper and calendering it, and thereafter slightly moistening the calendered coating, with or without a final drying operation. The coating, drying and calendering operations which comprise the process of the present invention are carried out in the well known manner and by the use of the well known means. The calendering may be effected, without regard to the dullness or glossiness of the finish, and in such manner as to yield a product having the desired smoothness. The result of the calendering operation is a smooth, flat, coating having a finish or gloss considerably higher than is acceptable for dull finish coated paper; the succeeding moistening operation reduces the gloss to a dull glareless finish which, however, is desirably smooth in texture.

The coating composition for use in the carrying out of this process consists essentially of an aqueous dispersion of adhesive and uncooked starch granules. While I prefer, in this connection, to use untreated cornstarch, it is of course within the scope of my invention to use other starches, such, for instance, as rice starch, tapioca starch and the like. For my purpose the starch pigment is used as a solid and not in colloidal solution. Such starch is practically insoluble in cold water and, in the state in which it is used, has no adhesive or binding properties, thus requiring the employment of an adhesive for bonding it to the paper. The latter constituent may be any of the prior art paper coating composition adhesives such, for instance, as a solution of casein, cooked starch or the like.

The uncooked starch need not be the only pigmentary component but may be and preferably is used in conjunction with a suitable mineral pigment such as satin white, a clay, or another of the mineral pigments commonly employed in this art. The mineral pigment content may vary within reasonable limits, it being noted that my preferred coating composition contains mineral pigment and uncooked starch in about equal parts by weight, and that as the mineral pigment content is progressively increased beyond that of the uncooked starch the dullness of the final finish is correspondingly lessened. Any material content of uncooked starch in the pigmentary constituent yields an appreciable effect—compositions containing 25% or more of uncooked starch yielding desirably dull finishes—when treated in accordance with the present process. While the content of uncooked starch may exceed that of the mineral pigment it generally is not economical to use the former in much greater amounts than the preferred proportion set out above.

It should be remarked here that this use of starch as a pigment is not to be confused with the common practice of using solutions of cooked starch or of so-called "soluble" starch as sizes, dressings or adhesives. My invention involves the use of uncooked dry starch as a pigmenting substance only. It also is to be distinguished from the practice of incorporating uncooked starch in a coating composition and subjecting the coated paper to a treatment designed to gelatinize the said starch.

The moistening operation following calendering may be carried out in a variety of manners, it being desirable to apply only as much water as is actually required for the desired effect, and, of course, to apply that amount relatively evenly. The application of the moisture may be by means of a wet roll carrying a film of water which is contacted with the calendered coating, or by means of a spray, steam jets, the provision of a humid or moisture-laden atmosphere, or the like, or by means of a combination of such moistening means. I have found that excellent results were obtainable using from 0.6 to 3.0 pounds of water per 1,000 square feet of coated surface. Where undue amounts of moisture are applied to the coated stock there is a tendency for the stock to cockle. It has been found advisable to hold the paper taut during the drying succeeding the moistening, whereby to avoid cockling thereof.

Final drying of the moistened sheet is not essential in all instances: thus, if the moistening has been effected by exposure of the calendered coated paper to humid air subsequent drying may not be necessary. However, such final drying seems to be a practical expedient in those cases where moistening has been effected by other means. This drying operation may be carried out in any suitable manner and by the use of any suitable means such, for instance, as a blast of warm air caused to pass over or impinge upon the coated stock. Where drying is necessary it is desirable to effect it quickly, in order to avoid excessive swelling of the fibers of the paper stock.

This process is operable in connection either with two-sided or one-sided coated stocks. For paper coated on both sides, it is convenient to first moisten one side, dry the paper, then moisten the other side, and dry again, without reeling between operations.

The following specific example illustrates but does not limit the present invention:

The coating composition

The coating is prepared as follows (all percentages being by weight): 710 pounds of clay paste, containing 60% solids, and 1290 pounds of satin white paste, containing 20% satin white, are mixed with 1615 pounds of casein solution containing 235 pounds total solids. Then 684 pounds of dry cornstarch are added, slowly, with stirring. The coating is mixed until it is of uniform consistency and is strained through a 100 mesh screen.

The process

The coating thus prepared is applied in the usual manner to the paper in web form on an ordinary paper coating machine. The paper is dried and reeled as in customary practice and then calendered on the usual supercalenders. After calendering, the coated paper is moistened by contacting the coating with a moist roll which applies about 1.5 pounds of water per 1,000 square feet of coated surface. The paper is then dried, by the aid of a blast of warm air. The resulting paper is smooth and has a very dull finish as compared with dull finish coated papers prepared by methods heretofore in use. It has an Ingersoll glarimeter value of 22°–30°, and prints much better than the usual dull finish coated papers.

Although the exact mechanism of my invention has not been fully determined, it seems likely that the following explanation is true. In the calendering operation the coating is reduced to a smooth surface comparable to that obtained in a high finished coated paper. Then, when the coating is subjected to the action of the moisture, the individual starch grains swell to some extent and thus produce a surface which diffuses the light falling upon it, whereby to produce a dull finish appearance. However, the size of the individual starch grains is so small compared to a half-tone dot that the printing qualities are not impaired.

I claim:

1. Calendered dull finish coated paper obtained by carrying out the process of claim 4 and characterized in that the coating thereon contains at least 25% of uncooked starch.

2. Calendered dull finish coated paper comprising a paper stock carrying on a surface thereof a calendered coating consisting essentially of uncooked starch and an adhesive, said product being obtained by carrying out a process involving coating a surface of the paper with an aqueous coating composition containing uncooked starch and an adhesive, drying and calendering the so coated paper and thereafter moistening the latter, said product being additionally characterized in that its coating has a dull finish.

3. Calendered dull finish coated paper obtained by coating a surface of a paper stock with an aqueous coating composition containing uncooked starch, a mineral pigment and an adhesive, drying and calendering the so coated product and thereafter moistening the latter, said product being additionally characterized in that its coating has a dull finish.

4. Process which comprises coating paper with an aqueous coating composition containing uncooked starch, drying, calendering, and moistening the coated paper.

5. Process of making dull finish coated paper which comprises applying an aqueous slurry containing uncooked starch to a paper stock, drying the coated paper, calendering and thereafter swelling the starch.

6. Process which comprises coating a surface of a paper web with an aqueous coating composition comprising uncooked starch and an adhesive, drying the so-coated web, calendering, and moistening the coating by application thereto of a limited amount of moisture.

7. Process which comprises coating a surface of a paper web with an aqueous coating composition comprising uncooked starch and an adhesive, drying the so-coated web, calendering, moistening the coating by application thereto of a limited amount of water, and drying the resulting product.

8. Process which comprises coating a surface of a paper web with an aqueous coating composition comprising uncooked starch, a mineral pigment and an adhesive, drying the so-coated web, calendering, moistening the coating by application thereto of a limited amount of water, and drying the resulting product.

9. Process which comprises coating a surface of a paper web with an aqueous coating composition comprising uncooked starch, a mineral pigment and an adhesive, drying the so-coated web, calendering, moistening the coating by the even distribution thereover of water in an amount not materially exceeding 3 pounds per 1,000 square feet of coated surface, and drying the resulting product.

10. Dull finish coated paper obtained by coating paper with an aqueous coating composition containing uncooked starch, a mineral pigment and an adhesive, drying and mechanically finishing the coating to the desired smoothness, and thereafter moistening the coating, the coated paper product being additionally characterized by smoothness and printing properties corresponding to the mechanical finishing applied and by a dull appearance.

DONALD B. BRADNER.